United States Patent
Hackborn et al.

(10) Patent No.: US 8,296,445 B1
(45) Date of Patent: Oct. 23, 2012

(54) SOFTWARE TESTING HARNESS

(75) Inventors: Dianne K. Hackborn, Santa Clara, CA (US); Michael A. Cleron, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 1004 days.

(21) Appl. No.: 12/268,220

(22) Filed: Nov. 10, 2008

Related U.S. Application Data

(60) Provisional application No. 60/987,363, filed on Nov. 12, 2007.

(51) Int. Cl.
*G06F 15/16* (2006.01)
(52) U.S. Cl. ........................ 709/228; 717/135
(58) Field of Classification Search ............. 709/228; 717/135
See application file for complete search history.

(56) References Cited

U.S. PATENT DOCUMENTS

| | | | | |
|---|---|---|---|---|
| 6,954,751 B2 * | 10/2005 | Christfort et al. | ............ | 707/736 |
| 6,973,417 B1 * | 12/2005 | Maxwell et al. | .................. | 703/2 |
| 6,986,148 B2 * | 1/2006 | Johnson et al. | ............... | 719/332 |
| 7,426,717 B1 * | 9/2008 | Schang et al. | ................ | 717/124 |
| 7,490,031 B1 * | 2/2009 | Qiu | ............................... | 703/22 |
| 2006/0129972 A1 * | 6/2006 | Tyburski et al. | ............. | 717/106 |
| 2007/0174380 A1 * | 7/2007 | Ansari et al. | .................. | 709/200 |
| 2007/0288896 A1 * | 12/2007 | Lee | ............... | 717/124 |

\* cited by examiner

*Primary Examiner* — Thomas Dailey
(74) *Attorney, Agent, or Firm* — Fish & Richardson P.C.

(57) ABSTRACT

A computer-implemented method includes instantiating a process on a mobile device. The method includes injecting instrumentation code to the process from a device external to the mobile device. The method includes injecting application code into the process and the application code and instrumentation code are written in the same language. The method includes monitoring the application in run time using the instrumentation code by intercepting requests from the application, sending simulated data to the application, and capturing screen shots of the mobile device. The method includes reporting on the application corresponding to the application code to a sub-system outside the process.

23 Claims, 8 Drawing Sheets

SOFTWARE TESTING HARNESS

CROSS-REFERENCE TO RELATED APPLICATIONS

This application claims priority from U.S. Provisional Application Ser. No. 60/987,363 filed Nov. 12, 2007, and entitled "Test Harness," the contents of which are incorporated herein by reference.

TECHNICAL FIELD

This instant specification relates to operation of a testing system for testing of software.

BACKGROUND

Modern software applications and systems can be extremely complex, and may contain thousands or millions of lines of interrelated code spread across numerous files. Modern programs are also more interdependent than ever on other programs. That is because Internet-based and other networked or otherwise connected systems continue to supplant stand-alone applications. Such networked applications may depend on many other programs to pass them appropriate data in order to run properly and without errors. Complex software systems carry with them a great risk of errors, such as so-called bugs.

This is particularly true of applications written for mobile platforms such as personal digital assistants and smartphones. Such mobile platforms often provide search and location-based services that require access to a central data provider such as GOOGLE, for providing maps information, search results, and other similar web-related content. As a result, such connected mobile devices must operate with systems that are out of the control of the person developing content for the mobile device.

Software generally is subjected to a number of iterative revisions as it moves from conception to initial launch (e.g., in alpha or beta test), and then through to commercial release. On its way to being complete, the software will invariably contain a number of bugs that must be eradicated. To find the bugs, a developer will generally need to test the software under simulated conditions, such as by providing it fake data and observing its response to such data

SUMMARY

This document describes systems and techniques that may be used to manage the development and testing of software. In particular, certain implementations involve injecting test instrumentation code into a process operating on a device such as a mobile device, along with application code running in the same process. The instrumentation code, which may naturally be coded in the same language as the application code, may interact with the application in various manners. For example, the instrumentation code may cause various activities to be run by the application code. The instrumentation code may also intercept messages coming from the application and provide input to the application.

By placing the instrumentation code and the application code in close relation, the instrumentation code may have unique access to the application, and may be able to obtain a maximum amount of data about the operation of the application with a minimum of interference with the application code. Also, the instrumentation code may report out, to a software test bed external to the tested device, information about the application, such as whether the test was a success or not, and the state of the device during and after the running of the application, may be accessed and analyzed.

In one implementation, a computer-implemented process is disclosed that comprises instantiating a process on a mobile device, injecting instrumentation code to the process from a device external to the mobile device, injecting application code into the process, and monitoring the application in run time using the instrumentation code. The process can be instantiated by an activity manager that is part of the mobile device's operating system. The instrumentation code can be written in the same language as the application code.

In some aspects, the method further comprises intercepting, with the instrumentation code, requests by the application and providing the application with data from the instrumentation code. The method can also include instantiating, from the instrumentation code, one or more predetermined activities in the application code. In addition, the method can comprise reporting an indicator of success and application status data to the device external to the mobile device when the predetermined activities have been run. And the method can also comprise capturing a screen shot using the instrumentation code and providing the screen shot to the device external from the mobile device. The screen shot may be automatically compared to a standard screen shot indicating a display for a properly operating application. In another aspect, the instrumentation code has access to all of the application's objects.

In another implementation, a computer software testing system is disclosed. The system comprises an activity running on a client device, application code running in the activity, and instrumentation code running in the activity, and reporting on an application corresponding to the application to a sub-system outside the activity. The system may also include an activity manager that launches the activity and places the application code and the instrumentation code into the activity. The instrumentation code can be written in the same language as the application code, and can be adapted to intercept requests by the application and to provide the application with data. Also, the instrumentation code can be adapted to instantiate one or more predetermined activities in the application code.

The details of one or more embodiments of the test harness features are set forth in the accompanying drawings and the description below. Other features and advantages of the test harness features will be apparent from the description and drawings, and from the claims.

DESCRIPTION OF DRAWINGS

Like reference symbols in the various drawings indicate like elements.

DETAILED DESCRIPTION

This document describes systems and techniques for managing the testing of software on a computing device such as a smartphone. The testing may involve creating a simulated surrounding for an application being tested. Such a surrounding may be created by injecting into a process associated with the application, a piece of instrumentation code that is directed to testing the application. The instrumentation code may control the application, such as by triggering the performance of certain activities by the application code, may intercept requests from the application to objects outside the process, may return simulated data to the application, and may report out to a test bed external to the device certain data for measuring the effectiveness of the operation of the application.

Figure 1:
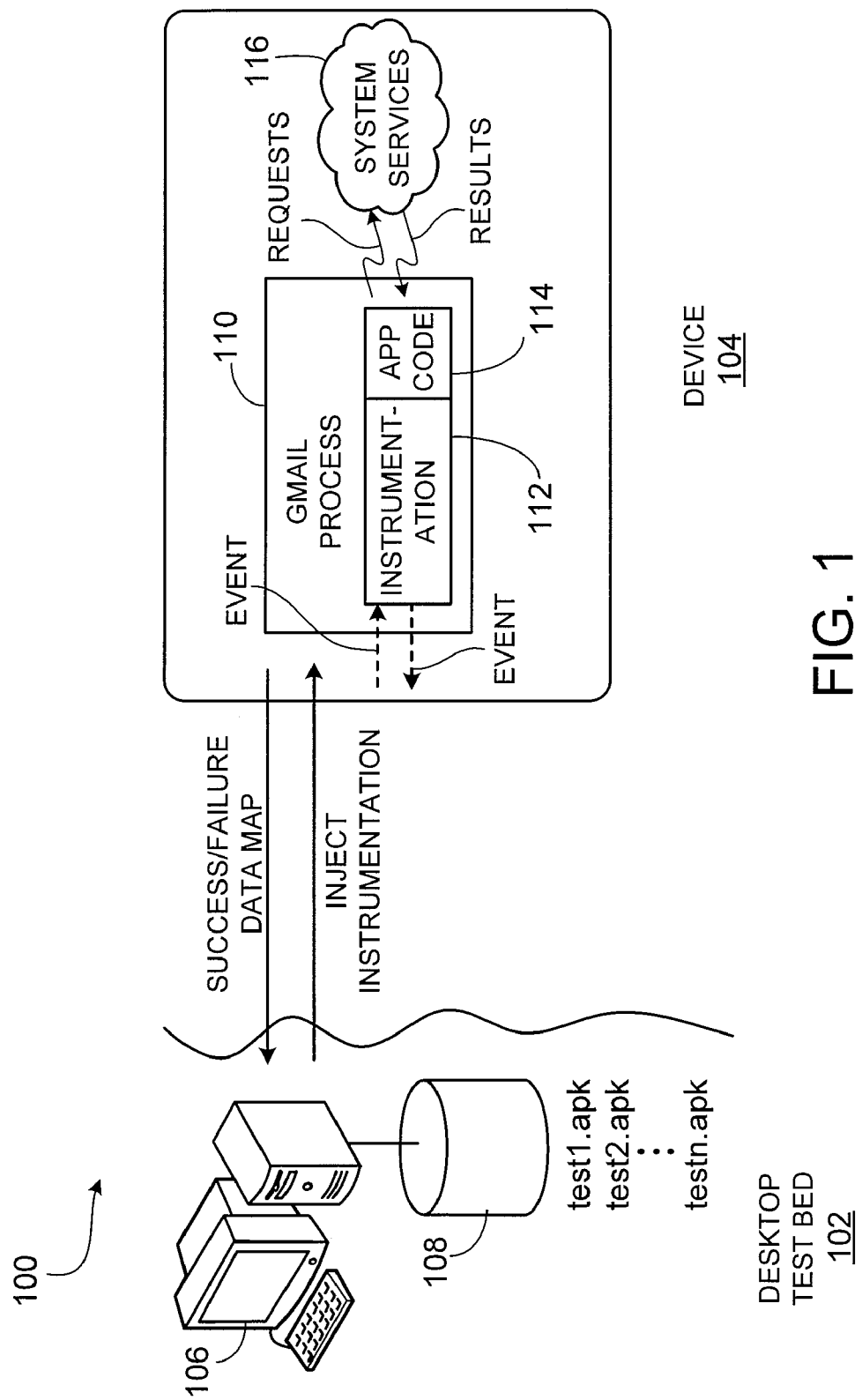
FIG. 1 is a conceptual diagram of an exemplary test harness system for use with computing devices.

FIG. 1 is a conceptual diagram of an exemplary test harness system 100 for use with computing devices. Generally, the system 100 involves two components—a testbed 102 running on a desktop computer 106, and a mobile device 104 on which is operating software code to be tested. The desktop testbed 102 may be loaded with a variety of applications for developing software and for testing the software. In one example, a database 108, or other similar storage, may contain one or no more applications that are instrumentation or test applications. Such applications may be coded to subject particular other applications on device 104 to various inputs, to determine how the other applications respond to such inputs.

For example, an instrumentation application may cause a navigational application to launch and to start an activity with the navigational application, by which the navigational application seeks location data from a contacts database on the device 104 and attempts to map a route between two different contacts in the system. The instrumentation code in such an example may cause the start of activities for obtaining the contact information, may provide hypothetical contact information by intercepting requests for contact information to a contacts database, and instead supplying other data for which a desired result is already known, and may monitor the operation of the application to determine how well the application operated.

In general, the device 104 may have a number of different processes operating on it such as GOOGLE GMAIL email process 110. GOOGLE GMAIL email process 110 is a process by which an electronic mail program may operate to obtain electronic mail from a remote server, format the electronic mail, and presented it to a user of device 104. The GOOGLE GMAIL email process may take familiar forms, and may provide familiar e-mail functionality to a user of device 104.

Operating inside the GOOGLE GMAIL email process 110 is application code 114 for a GOOGLE GMAIL email application, and instrumentation code 112 that is designed to operate with the application code. By operating inside the same process as the application code 114, the instrumentation code 112 may have ready access to many, if not all, of the objects associated with application code 114. As a result, the instrumentation code 112 may readily monitor and control the operation of the application code 114, so as to provide superior tracking and reporting of the operation of the application code 114.

The testbed 102 may initially inject instrumentation code into the GOOGLE GMAIL email process 110 after the process has been initially started, as shown by the arrow flowing from testbed 102 to device 104. In return, the instrumentation code 112 may provide back to the testbed 102 indicators of various forms relating to the operation the application code. For example, the instrumentation code 112 may report back, at the end of the operation of the application code 114, an indicator of whether the testing of the application code was a success or failure, and a data map regarding information about the state and operation of the application code 114. Such data map may take a variety of forms, and may be in a format that is compatible with an application running on the testbed 102. For example, as the application code 114 runs as an application, the instrumentation code 112 may collect data and may store it until the application is complete. The data may be associated with particular events during the operation of the application code so that a time-based analysis of the application may be conducted by an operator of the testbed 102.

Other similar information may also be captured and provided to testbed 102 by instrumentation code 112. For example, instrumentation code 112 may be provided with one or more methods for capturing an image of a screen of an application running application code 114, and may provide that image to the testbed 102. The testbed 102 may have previously been provided with a screenshot that shows a display when an application is operating properly, and may compare the captured screenshot from the application code 114 to the previously-stored screen shot, to confirm whether or not the application operated properly.

The instrumentation code 112 may also provide various inputs to the application code 114, other than data that appears to be from other items on the device 104. For example, the instrumentation code 112 may start an activity for an application and may then pass key events that indicate the pressing of keys on the device 104. For example, the instrumentation code 112 may initiate a mapping activity, and may simulate the pressing of directional keys to create a panning operation in a mapping application.

System services 116 represent various other items operating on device 104. The application code 114 may communicate with system services 116 by providing requests and receiving in response results from the system services 116. Although such requests and results are shown here as passing directly from the application code 114 to the system services 116, such communications would normally occur through the instrumentation code 112, so that the instrumentation code may better monitor the operation of the application.

Figure 2A:
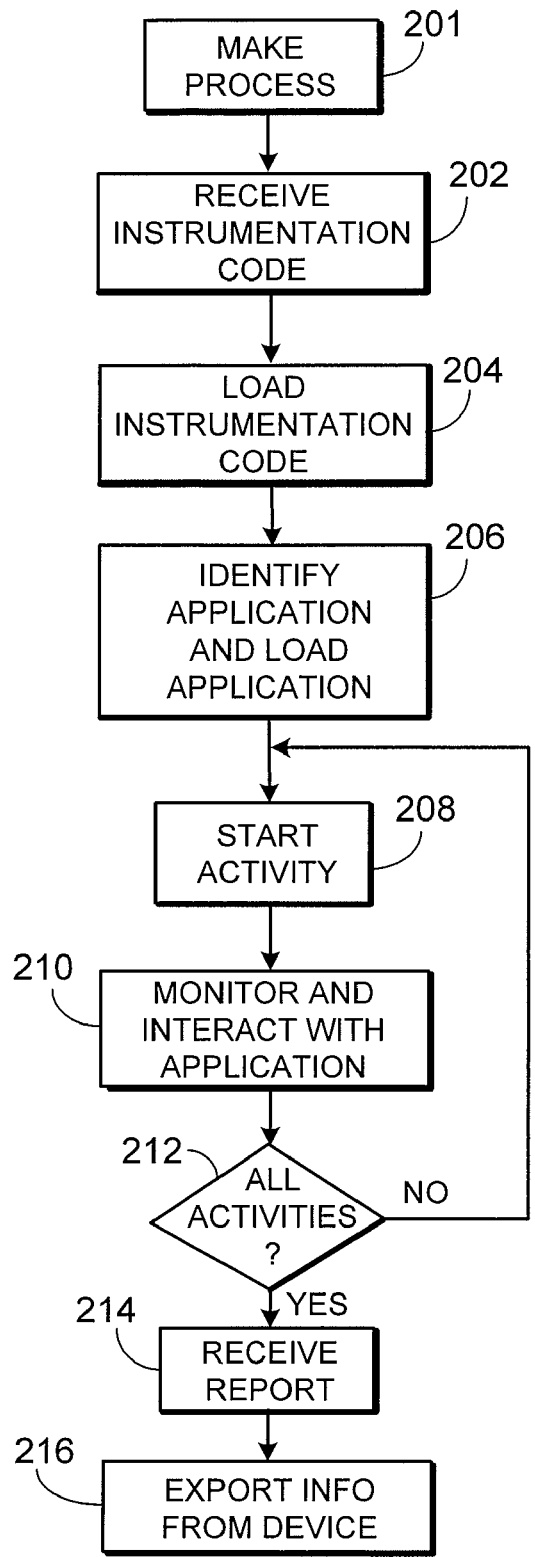
FIG. 2A is a flow chart of a process for using a test harness to monitor an application on a computing device.

FIG. 2A is a flow chart of a process 200 for using a test harness to monitor an application on a computing device. In general, the process 200 includes making a software process into which instrumentation code and application code are injected or provided, and operating the process so that the instrumentation code may monitor and control the application code (or may monitor and control an application corresponding to the application code). The instrumentation code may then report back information about the application code to a central code management system.

At box 201, a process is initially made by a system, such as by an activity manager running on a mobile device. The activity manager or other component then receives instrumentation code, at box 202, such as from a device external to the device on which the software is being tested. The instrumentation code may also be received before the process is begun, such as when provision of the instrumentation code to the device triggers the instantiation of a process.

At box 204, the instrumentation code is loaded into the process. For example, the process may be initially created to receive various forms of code, and the instrumentation code may be loaded in a familiar manner, just like other code is loaded into other processes associated with an operating system on the device. At box 206, an application is identified and loaded into the process. The application may be pointed to by data in the instrumentation code, or in the request that included the instrumentation code. For example, a unique identifier for the application code may be provided in or with the instrumentation code so that the activity manager can find the proper application code. The activity manager may also report back, to a device that provided the instrumentation code, a handle or other identifier for the instrumentation code, so that the external device may more readily communicate with the instrumentation code during the operation of the process.

With the instrumentation code and the application code loaded in the process, the activity manager or the instrumentation code may start an activity associated with the application code, as shown at box 208. Such an activity may take a variety of forms, as discussed above, such as by asking an application to locate data about a contact in a contact list on a mobile device. At box 210, the process interacts with and monitors the application. Such interaction may occur by an activity manager controlling certain instrumentation code, or by the instrumentation code acting on its own.

At box 212, a decision box asks whether all activities for the application have been performed. If not all activities have been performed, the process reverts back to starting another activity, and repeats the activities until all activities have been performed in a manner sufficient to determine whether the software is operating correctly. If all activities have been performed, the process receives a report, at box 214, about the operation of the application. For example, the instrumentation code may have monitored the inputs or outputs from the application, and also monitored the value of various objects associated with the application while the application ran, and may generate a report from such monitoring of the application's operation. The report or information related to the report may then be exported from the device, at box 216. For example, various indications of the state of the device during the operation of an application may be exported to a system external to the device on which the code is being tested.

Figure 2B:
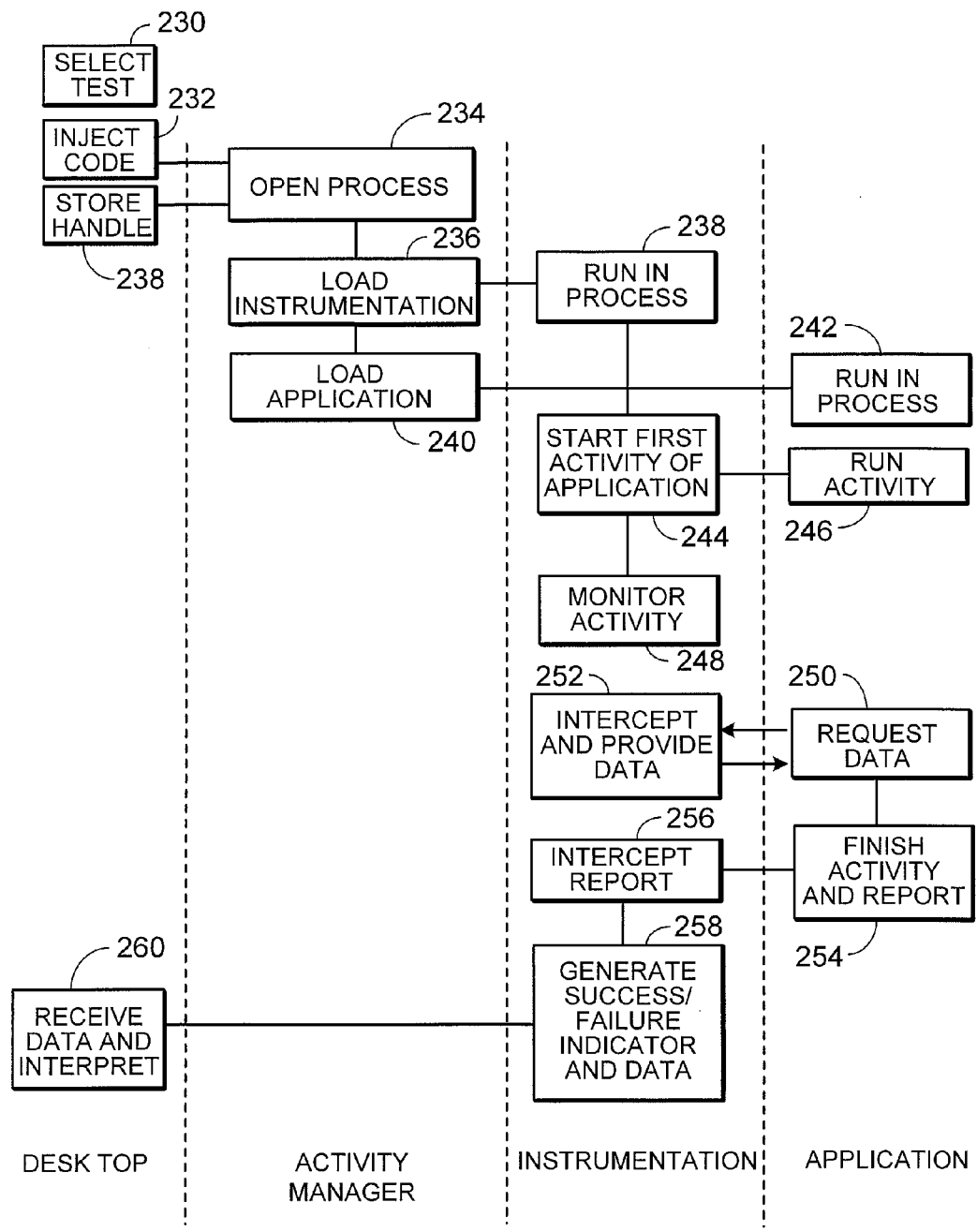
FIG. 2B is a swim lane diagram showing the interaction of exemplary components with respect to a test harness.

FIG. 2B is a swim lane diagram showing the interaction of exemplary components with respect to a test harness. In general, the process shown here is similar to the process in FIG. 2A, but provides an indication of particular exemplary components in a system that may perform various steps in the process.

At box 230, a test is selected by a desktop testbed system. For example, a user may select a test from a list of tests to be performed on certain software that the user is developing. Alternatively, a list of tests may be queued and may be automatically selected to run through an entire test suite on certain software code. At step 232, the desktop injects the code into a mobile device where it is handled by an activity manager on the device. The activity manager opens a process for testing certain application code relating to the injected code, as shown at box 234. The activity manager may also pass a handle or similar item back to the desktop testbed, as shown at box 238. A handle may be used by the testbed to identify for the activity manager the appropriate instrumentation, or test, at a later time if the testbed wishes to make a request of the activity manager.

Upon opening the process, the activity manager also loads instrumentation code into the process, and that code runs in the process, as shown at boxes 236 and 238. Also, the activity manager may load application code 240 that is associated with the instrumentation code, and that application code may run in the process also, as shown at boxes 240 and 242.

At a determined point in time, the instrumentation code may start a first activity of the application, at box 244. For example, the application may, until that point in time, have been waiting for an input. The instrumentation code may stimulate an input, such as an input to a touch screen or a multi-directional keypad, which the instrumentation understands to be likely to create a certain response in the application. At box 246, the application begins to run the activity, such as by responding to the received input (e.g., a simulated press of a keypad key). At the same time, the instrumentation monitors the activity, as shown at box 248. For example, the instrumentation may monitor changes made by the application to values stored in memory, or may also monitor a screen associated with the application to determine if a display on the screen has changed as a result of the running of the activity.

At some point, the application may need data that is external to the process, and may make a request to another component in the system for such data, as shown at box 250. The instrumentation code may intercept the request and may provide data of the type that the application is seeking, as shown at box 252. For example, the data may be test data for which there is a predictable result, so that the operation of the application may be checked against the test data as a control. Upon receiving the data, the application may finish the activity and may report out information related to the activity to the instrumentation code, as shown at box 254. For example, the application may report the value of various variables stored with the process at the end of the application running.

At box 256, the instrumentation code intercepts or otherwise receives the report from the application. The instrumentation code may then interpret the report, add information to the report, or change information in the report in various ways. For example, the instrumentation code may make an initial determination, such as by determining that the received storage of variables from the application are provided in an appropriate format, or provided they are provided at all, that the test was a success or a failure at step 258. Such a determination may then be passed along to the desktop testbed along with other information such as the report from the application.

At box 260, the testbed receives such data and interprets the data. For example, the testbed may store the data for a long period of time and a graphical user interface (GUI) may permit a user to interact with the returned data and interpret it to determine whether the application operated properly.

By these mechanisms, the process shown here and systems associated with the process may provide a more convenient mechanism by which to analyze application code operating on a device. Such monitoring may be closely linked to the application code because the instrumentation code is operating inside a common process with the application code. Also, the instrumentation code may, in appropriate circumstances, operate with less interference with the application code, thereby providing a more reliable and simpler testing mechanism in the system.

Figure 3:
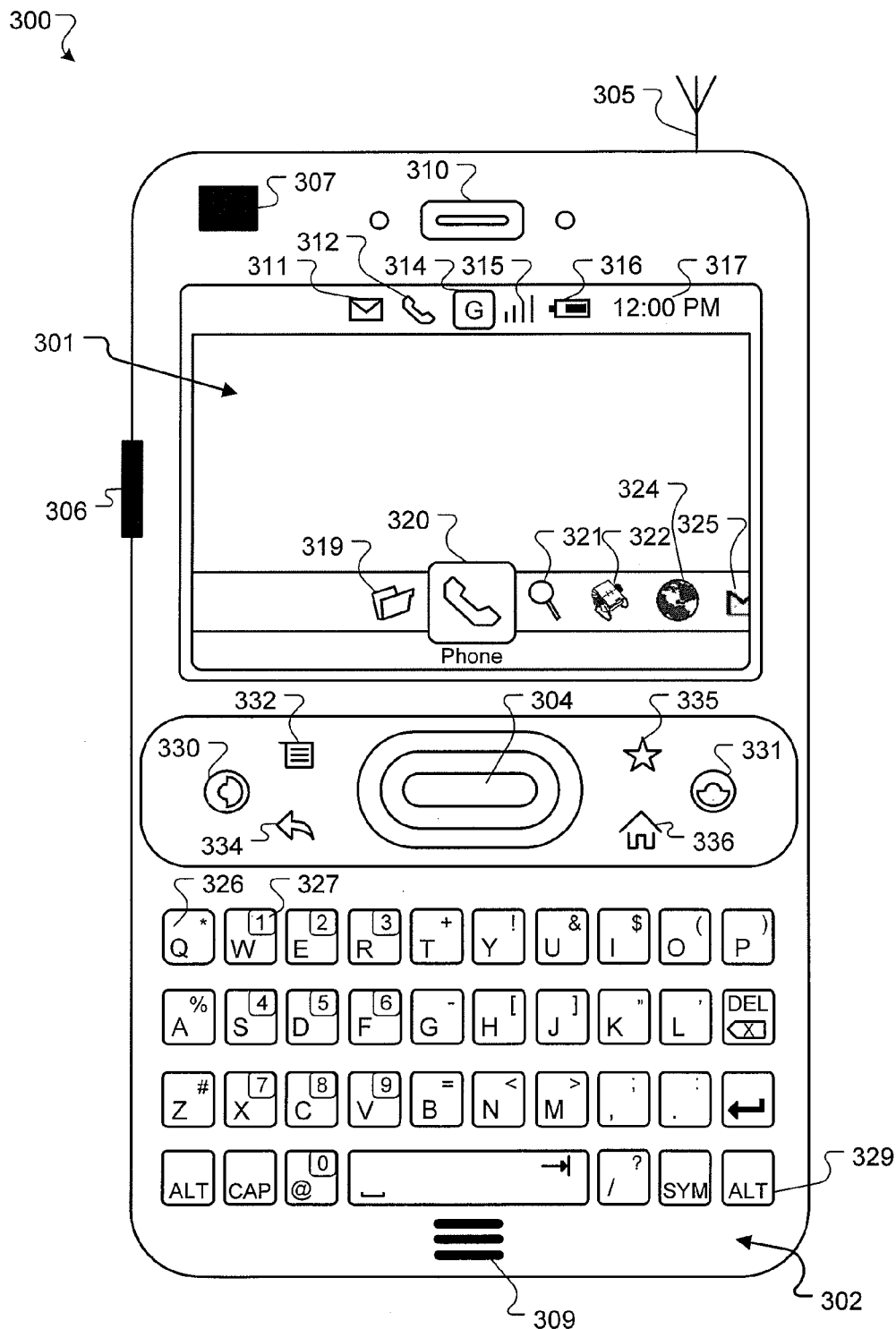
FIG. 3 is a schematic representation of an exemplary mobile device that implements embodiments of the graphics management system described herein.

Referring now to FIG. 3, the exterior appearance of an exemplary device 300 to which the test harness can be applied is illustrated. Briefly, and among other things, the device 300 includes a processor configured to operate various processes upon request of a user of the mobile device or control of an external device.

In more detail, the hardware environment of the device 300 includes a display 301 for displaying text, images, and video to a user; a keyboard 302 for entering text data and user commands into the device 300; a pointing device 304 for pointing, selecting, and adjusting objects displayed on the display 301; an antenna 305; a network connection 306; a camera 307; a microphone 309; and a speaker 310. Although the device 300 shows an external antenna 305, the device 300 can include an internal antenna, which is not visible to the user.

The display 301 can display video, graphics, images, and text that make up the user interface for the software applications used by the device 300, and the operating system programs used to operate the device 300. Among the possible elements that may be displayed on the display 301 are a new mail indicator 311 that alerts a user to the presence of a new message; an active call indicator 312 that indicates that a telephone call is being received, placed, or is occurring; a data standard indicator 314 that indicates the data standard currently being used by the device 300 to transmit and receive data; a signal strength indicator 315 that indicates a measurement of the strength of a signal received by via the antenna 305, such as by using signal strength bars; a battery life indicator 316 that indicates a measurement of the remaining battery life; or a clock 317 that outputs the current time.

The display 301 may also show application icons representing various applications available to the user, such as a web browser application icon 319, a phone application icon 320, a search application icon 321, a contacts application icon 322, a mapping application icon 324, an email application icon 325, or other application icons. In one example implementation, the display 301 is a quarter video graphics array (QVGA) thin film transistor (TFT) liquid crystal display (LCD), capable of 16-bit or better color.

A user uses the keyboard (or "keypad") 302 to enter commands and data to operate and control the operating system and applications. The keyboard 302 includes standard keyboard buttons or keys associated with alphanumeric characters, such as keys 326 and 327 that are associated with the alphanumeric characters "Q" and "W" when selected alone, or are associated with the characters "*" and "1" when pressed in combination with key 329. A single key may also be associated with special characters or functions, including unlabeled functions, based upon the state of the operating system or applications invoked by the operating system. For example, when an application calls for the input of a numeric character, a selection of the key 327 alone may cause a "1" to be input.

In addition to keys traditionally associated with an alphanumeric keypad, the keyboard 302 also includes other special function keys, such as an establish call key 330 that causes a received call to be answered or a new call to be originated; a terminate call key 331 that causes the termination of an active call; a drop down menu key 332 that causes a menu to appear within the display 301; a backward navigation key 334 that causes a previously accessed network address to be accessed again; a favorites key 335 that causes an active web page to be placed in a bookmarks folder of favorite sites, or causes a bookmarks folder to appear; a home page key 336 that causes an application invoked on the device 300 to navigate to a predetermined network address; or other keys that provide for multiple-way navigation, application selection, and power and volume control.

The user uses the pointing device 304 to select and adjust graphics and text objects displayed on the display 301 as part of the interaction with and control of the device 300 and the applications invoked on the device 300. The pointing device 304 is any appropriate type of pointing device, and may be a joystick, a trackball, a touch-pad, a camera, a voice input device, a touch screen device implemented in combination with the display 301, or any other input device.

The antenna 305, which can be an external antenna or an internal antenna, is a directional or omni-directional antenna used for the transmission and reception of radiofrequency (RF) signals that implement point-to-point radio communication, wireless local area network (LAN) communication, or location determination. The antenna 305 may facilitate point-to-point radio communication using the Specialized Mobile Radio (SMR), cellular, or Personal Communication Service (PCS) frequency bands, and may implement the transmission of data using any number or data standards. For example, the antenna 305 may allow data to be transmitted between the device 300 and a base station using technologies such as Wireless Broadband (WiBro), Worldwide Interoperability for Microwave ACCess (WiMAX), 3GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only) (EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with an QUALCOMM RTR6285™ transceiver and PM7540™ power management circuit.

The wireless or wired computer network connection 306 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 306 may connect to a LAN network, a corporate or government WAN network, the Internet, a telephone network, or other network. The network connection 306 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 3.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE-1394 FIREWIRE connector, a Universal Serial Bus (USB) connector (including a mini-B USB interface connector), a serial port connector, a parallel port connector, or other wired connector. In another implementation, the functions of the network connection 306 and the antenna 305 are integrated into a single component.

The camera 307 allows the device 300 to capture digital images, and may be a scanner, a digital still camera, a digital video camera, or other digital input device. In one example implementation, the camera 307 is a 3 mega-pixel (MP) camera that utilizes a complementary metal-oxide semiconductor (CMOS).

The microphone 309 allows the device 300 to capture sound, and may be an omni-directional microphone, a unidirectional microphone, a bi-directional microphone, a shotgun microphone, or other type of apparatus that converts sound to an electrical signal. The microphone 309 may be used to capture sound generated by a user, for example when the user is speaking to another user during a telephone call via the device 300. Conversely, the speaker 310 allows the device to convert an electrical signal into sound, such as a voice from another user generated by a telephone application program, or a ring tone generated from a ring tone application program. Furthermore, although the device 300 is illustrated in FIG. 3 as a handheld device, in further implementations the device 300 may be a laptop, a workstation, a midrange computer, a mainframe, an embedded system, telephone, desktop PC, a tablet computer, a PDA, or other type of computing device.

Figure 4:
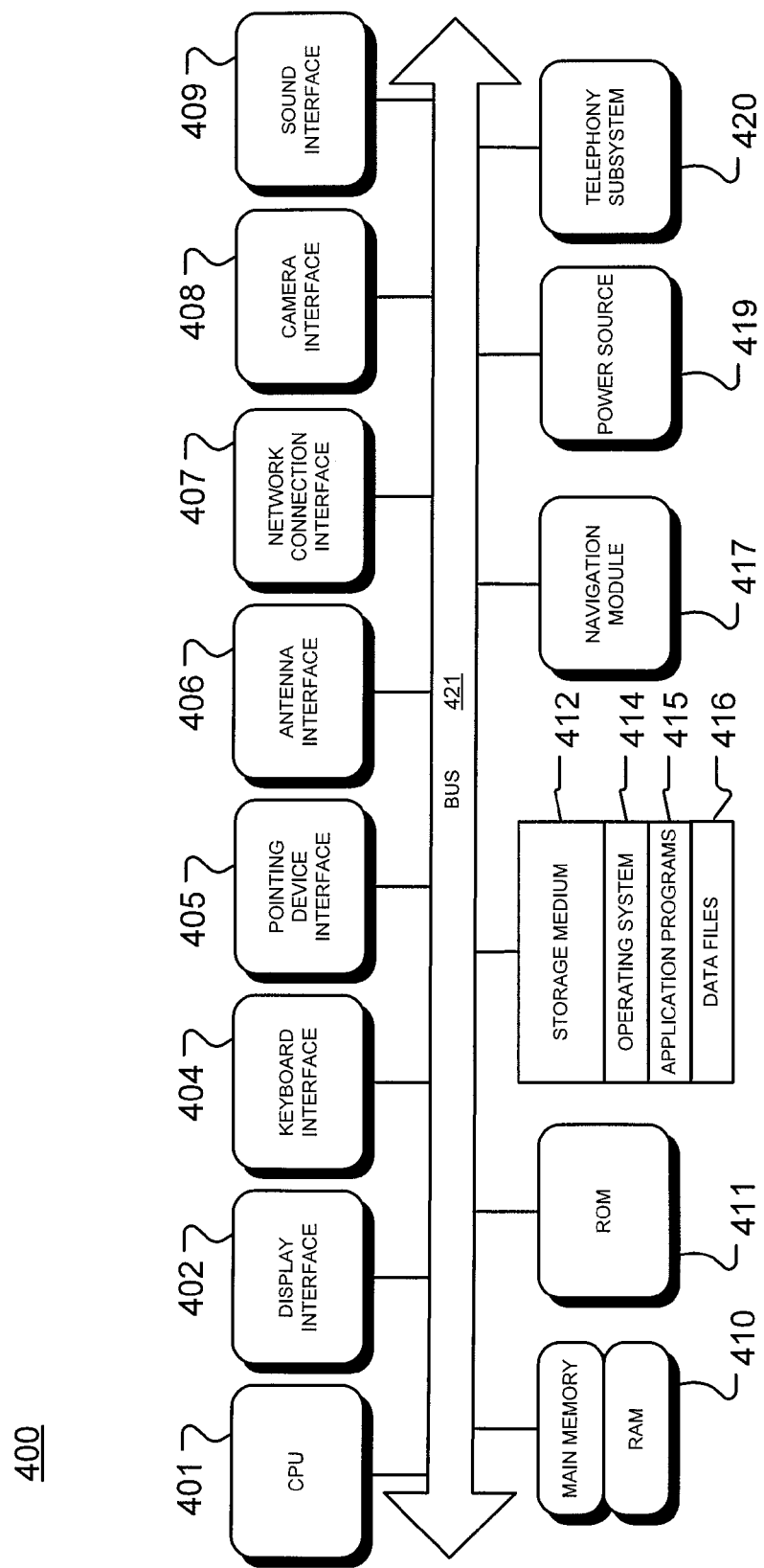
FIG. 4 is a block diagram illustrating the internal architecture of the device of FIG. 3.

FIG. 4 is a block diagram illustrating an internal architecture 400 of the device 300. The architecture includes a central processing unit (CPU) 401 where the computer instructions that comprise an operating system or an application are processed; a display interface 402 that provides a communication interface and processing functions for rendering video, graphics, images, and texts on the display 301, provides a set of built-in controls (such as buttons, text and lists), and supports diverse screen sizes; a keyboard interface 404 that provides a communication interface to the keyboard 302; a pointing device interface 405 that provides a communication interface to the pointing device 304; an antenna interface 406 that provides a communication interface to the antenna 305; a network connection interface 407 that provides a communication interface to a network over the computer network connection 306; a camera interface 408 that provides a communication interface and processing functions for capturing digital images from the camera 307; a sound interface 409 that provides a communication interface for converting sound into electrical signals using the microphone 309 and for converting electrical signals into sound using the speaker 310; a random access memory (RAM) 410 where computer instructions and data are stored in a volatile memory device for processing by the CPU 401; a read-only memory (ROM) 411 where invariant low-level systems code or data for basic system functions such as basic input and output (I/O), startup, or reception of keystrokes from the keyboard 302 are stored in a non-volatile memory device; a storage medium 412 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 414, application programs 415 (including, for example, a web browser application, a widget or gadget engine, and or other applications, as necessary) and data files 416 are stored; a navigation module 417 that provides a real-world or relative position or geographic location of the device 300; a power source 419 that provides an appropriate alternating current (AC) or direct current (DC) to power components; and a telephony subsystem 420 that allows the device 300 to transmit and receive sound over a telephone network. The constituent devices and the CPU 401 communicate with each other over a bus 421.

The CPU 401 can be one of a number of computer processors. In one arrangement, the computer CPU 401 is more than one processing unit. The RAM 410 interfaces with the computer bus 421 so as to provide quick RAM storage to the CPU 401 during the execution of software programs such as the operating system application programs, and device drivers. More specifically, the CPU 401 loads computer-executable process steps from the storage medium 412 or other media into a field of the RAM 410 in order to execute software programs. Data is stored in the RAM 410, where the data is accessed by the computer CPU 401 during execution. In one example configuration, the device 300 includes at least 128 MB of RAM, and 256 MB of flash memory.

The storage medium 412 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300, or to upload data onto the device 300.

A computer program product is tangibly embodied in storage medium 412, a machine-readable storage medium. The computer program product includes instructions that, when read by a machine, operate to cause a data processing apparatus to store image data in the mobile device. In some embodiments, the computer program product includes instructions that respond to an external test bed and monitor and control the operation of certain applications running on the device.

The operating system 414 may be a LINUX-based operating system such as the ANDROID mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 414 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON™, FLASH LITE, or MICROSOFT .NET Compact, or another appropriate environment.

The device stores computer-executable code for the operating system 414, and the application programs 415 such as an email, instant messaging, a video service application, a mapping application word processing, spreadsheet, presentation, gaming, mapping, web browsing, JAVASCRIPT engine, or other applications. For example, one implementation may allow a user to access the GOOGLE GMAIL email application, the GOOGLE TALK instant messaging application, a YOUTUBE video service application, a GOOGLE MAPS or GOOGLE EARTH mapping application, or a GOOGLE PICASA imaging editing and presentation application. The application programs 415 may also include a widget or gadget engine, such as a TAFRI™ widget engine, a MICROSOFT gadget engine such as the WINDOWS SIDE-BAR gadget engine or the KAPSULES™ gadget engine, a YAHOO! widget engine such as the KONFABULTOR™ widget engine, the APPLE DASHBOARD widget engine, the GOOGLE gadget engine, the KLIPFOLIO widget engine, an OPERA™ widget engine, the WIDSETS™ widget engine, a proprietary widget or gadget engine, or other widget or gadget engine the provides host system software for a physically-inspired applet on a desktop.

It may be possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 417 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 417 may also be used to measure angular displacement, orientation, or velocity of the device 300, such as by using one or more accelerometers.

Figure 5:
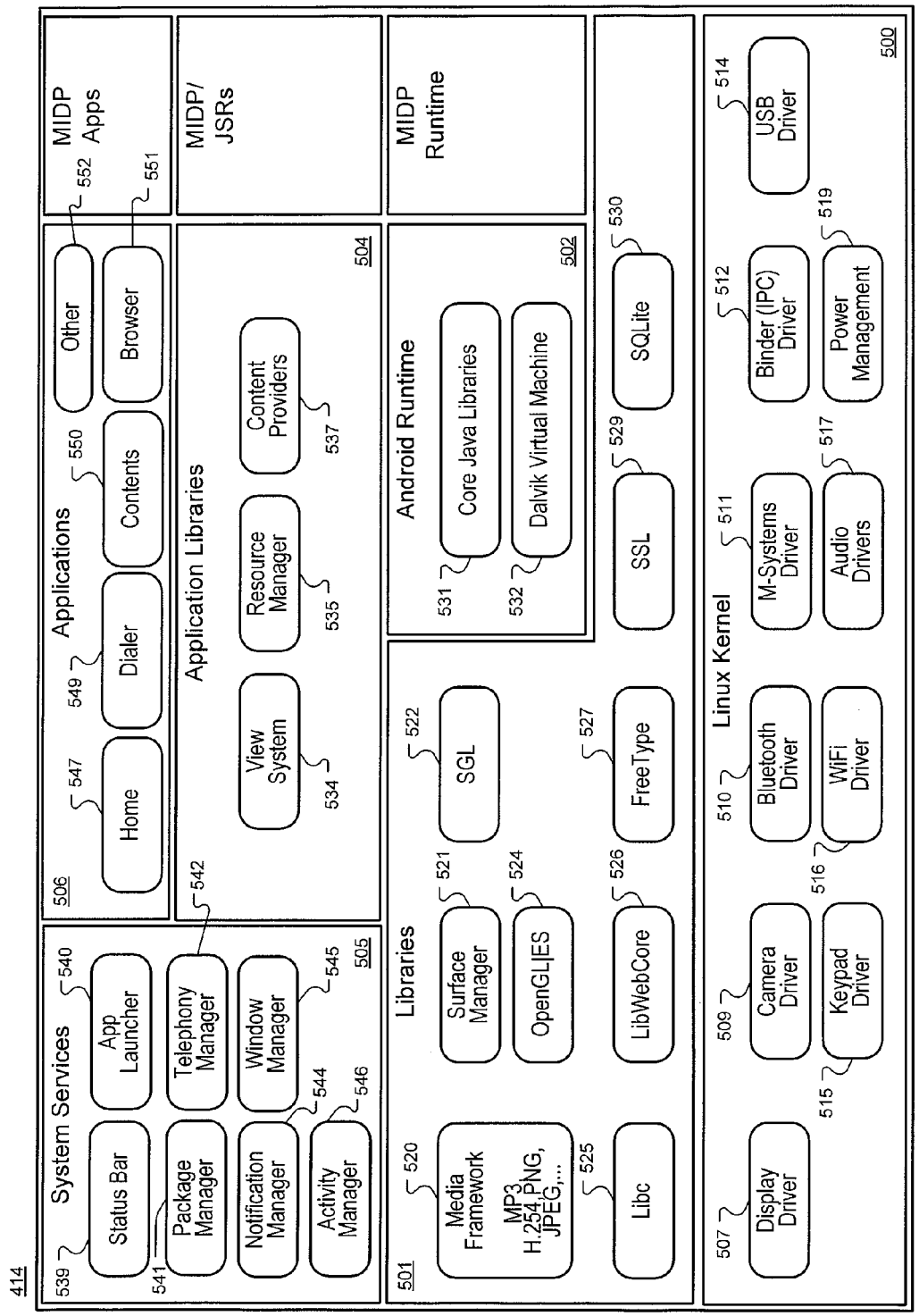
FIG. 5 is a block diagram illustrating exemplary components of the operating system used by the device of FIG. 3.

FIG. 5 is a block diagram illustrating exemplary components of the operating system 414 used by the device 300, in the case where the operating system 414 is the GOOGLE mobile device platform. The operating system 414 invokes multiple processes, while ensuring that the associated phone application is responsive, and that wayward applications do not cause a fault (or "crash") of the operating system. Using task switching, the operating system 414 allows for the switching of applications while on a telephone call, without losing the state of each associated application. The operating system 414 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 414 can generally be organized into six components: a kernel 500, libraries 501, an operating system runtime 502, application libraries 504, system services 505, and applications 506. The kernel 500 includes a display driver 507 that allows software such as the operating system 414 and the application programs 415 to interact with the display 301 via the display interface 402, a camera driver 509 that allows the software to interact with the camera 307; a BLUETOOTH driver 510; a M-Systems driver 511; a binder (IPC) driver 512, a USB driver 514 a keypad driver 515 that allows the software to interact with the keyboard 302 via the keyboard interface 404; a WiFi driver 516; audio drivers 517 that allow the software to interact with the microphone 309 and the speaker 310 via the sound interface 409; and a power management component 519 that allows the software to interact with and manage the power source 419.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or Audio/Video Remote Control Profile (AVRCP). The BLUETOOTH driver provides JAVA bindings for scanning, pairing and unpairing, and service queries.

The libraries 501 include a media framework 520 that supports standard video, audio and still-frame formats (such as Moving Picture Experts Group (MPEG)-4, H.264, MPEG-1 Audio Layer-3 (MP3), Advanced Audio Coding (AAC), Adaptive Multi-Rate (AMR), Joint Photographic Experts Group (JPEG), and others) using an efficient JAVA Application Programming Interface (API) layer; a surface manager 521; a simple graphics library (SGL) 522 for two-dimensional application drawing; an Open Graphics Library for Embedded Systems (OpenGL ES) 524 for gaming and three-dimensional rendering; a C standard library (LIBC) 525; a LIBWEBCORE library 526; a FreeType library 527; an SSL 529; and an SQLite library 530.

The operating system runtime 502 includes core JAVA libraries 531, and a Dalvik virtual machine 532. The Dalvik virtual machine 532 is a custom, virtual machine that runs a customized file format (.DEX).

The operating system 414 can also include Mobile Information Device Profile (MIDP) components such as the MIDP JAVA Specification Requests (JSRs) components, MIDP runtime, and MIDP applications as shown in FIG. 5. The MIDP components can support MIDP applications running on the device 300.

With regard to graphics rendering, a system-wide composer manages surfaces and a frame buffer and handles window transitions, using the OpenGL ES 524 and two-dimensional hardware accelerators for its compositions.

The Dalvik virtual machine 532 may be used with an embedded environment, since it uses runtime memory very efficiently, implements a CPU-optimized bytecode interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file formal at build-time. The associated bytecodes are designed for quick interpretation, since register-based instead of stack-based instructions reduce memory and dispatch overhead, since using fixed width instructions simplifies parsing, and since the 16-bit code units minimize reads.

The application libraries 504 include a view system 534, a resource manager 535, and content providers 537. The system services 505 includes a status bar 539; an application launcher 540; a package manager 541 that maintains information for all installed applications; a telephony manager 542 that provides an application level JAVA interface to the telephony subsystem 420; a notification manager 544 that allows all applications access to the status bar and on-screen notifications; a window manager 545 that allows multiple applications with multiple windows to share the display 301; and an activity manager 546 that runs each application in a separate process, manages an application life cycle, and maintains a cross-application history.

The applications 506 include a home application 547, a dialer application 549, a contacts application 550, a browser application 551, and—general application 552.

The telephony manager 542 provides event notifications (such as phone state, network state, Subscriber Identity Module (SIM) status, or voicemail status), allows access to state information (such as network information, SIM information, or voicemail presence), initiates calls, and queries and controls the call state. The browser application 551 renders web pages in a full, desktop-like manager, including navigation functions. Furthermore, the browser application 551 allows single column, small screen rendering, and provides for the embedding of HTML views into other applications.

Figure 6:
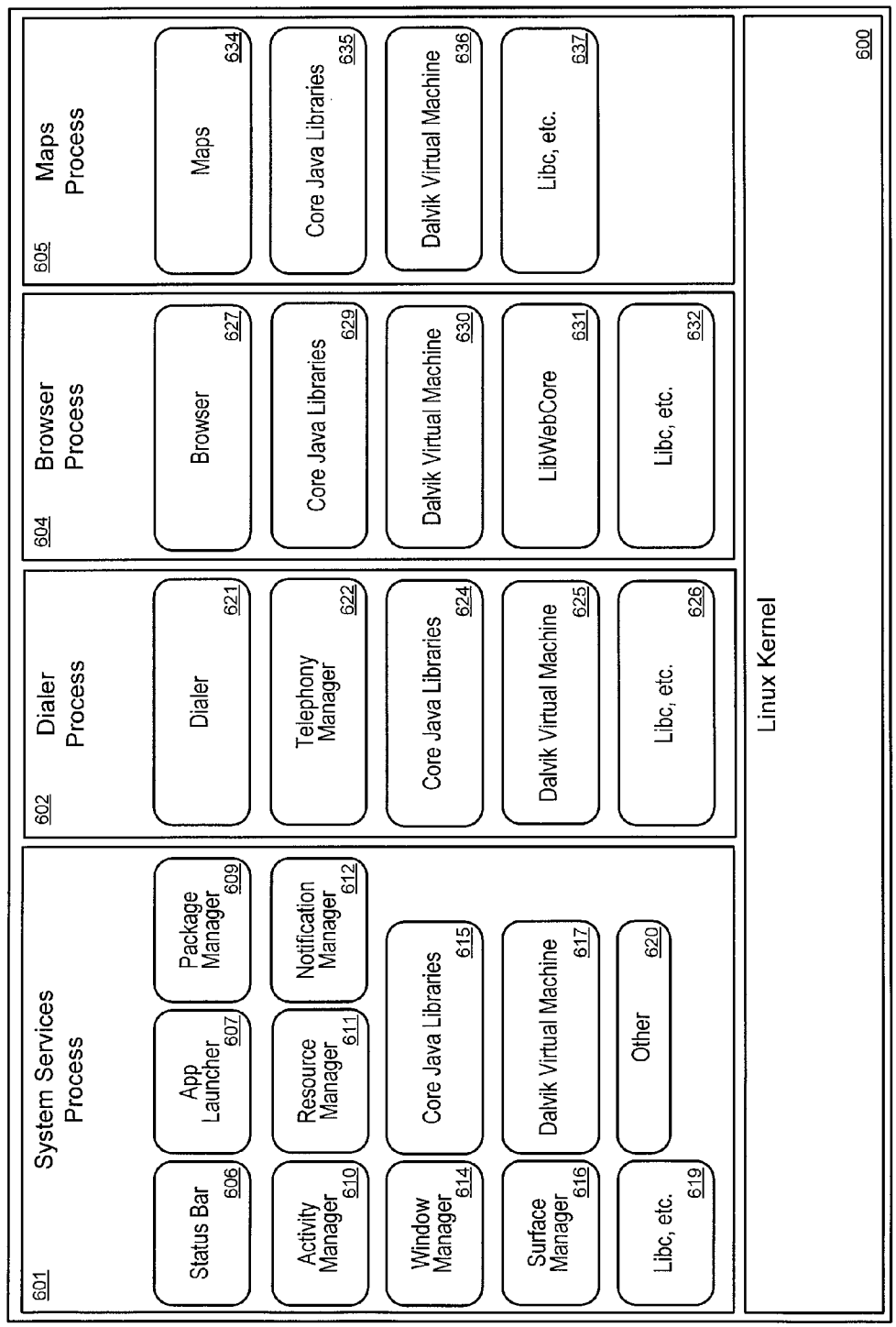
FIG. 6 is a block diagram illustrating exemplary processes implemented by the operating system kernel of FIG. 5.

FIG. 6 is a block diagram illustrating exemplary processes implemented by the operating system kernel 600. Generally, applications and system services run in separate processes, where the activity manager 546 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 616, the window manager 614, or the activity manager 610 can be continuously executed while the device 300 is powered. Additionally, some application-specific process can also be persistent. For example, processes associated with the dialer application 621, may also be persistent.

The processes implemented by the operating system kernel 600 may generally be categorized as system services processes 601, dialer processes 602, browser processes 604, and maps processes 605. The system services processes 601 include status bar processes 606 associated with the status bar 539; application launcher processes 607 associated with the application launcher 540; package manager processes 609 associated with the package manager 541; activity manager processes 610 associated with the activity manager 546; resource manager processes 611 associated with a resource manager 535 that provides access to graphics, localized strings, and XML layout descriptions; notification manger processes 612 associated with the notification manager 544; window manager processes 614 associated with the window manager 545; core JAVA libraries processes 615 associated with the core JAVA libraries 531; surface manager processes 616 associated with the surface manager 521; Dalvik virtual machine processes 617 associated with the Dalvik virtual machine 532, LIBC processes 619 associated with the LIBC library 525; and general processes 620 associated with the general application 552.

The dialer processes 602 include dialer application processes 621 associated with the dialer application 549; telephony manager processes 622 associated with the telephony manager 542; core JAVA libraries processes 624 associated with the core JAVA libraries 531; Dalvik virtual machine processes 625 associated with the Dalvik Virtual machine 532; and LIBC processes 626 associated with the LIBC library 525. The browser processes 604 include browser application processes 627 associated with the browser application 551; core JAVA libraries processes 629 associated with the core JAVA libraries 531; Dalvik virtual machine processes 630 associated with the Dalvik virtual machine 532; LIBWEBCORE processes 631 associated with the LIBWEBCORE library 526; and LIBC processes 632 associated with the LIBC library 525.

The maps processes 605 include maps application processes 634, core JAVA libraries processes 635, Dalvik virtual machine processes 636, and LIBC processes 637. Notably, some processes, such as the Dalvik virtual machine processes, may exist within one or more of the systems services processes 601, the dialer processes 602, the browser processes 604, and the maps processes 605.

Figure 7:
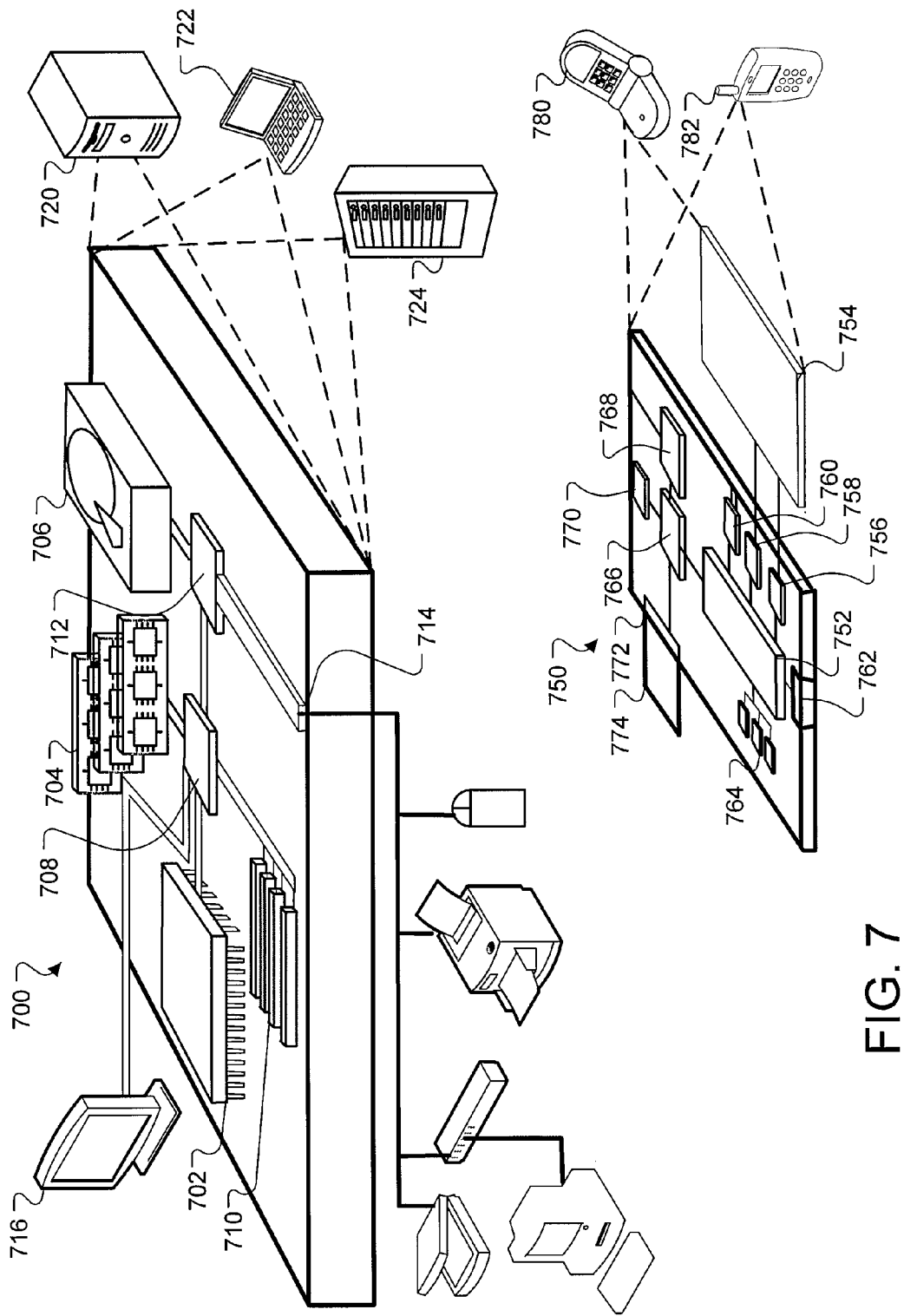
FIG. 7 shows an example of a computer device and a mobile computer device that can be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal.

The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, comprising:
   instantiating a process for providing e-mail functionality, mapping functionality, or dialing functionality on a mobile device;
   injecting instrumentation code into the process from a device external to the mobile device;
   injecting application code into the process, wherein the application code and the instrumentation code are written in the same language;
   monitoring in run time an application corresponding to the application code using the instrumentation code, comprising:
   intercepting, by the instrumentation code, requests from the application to objects outside the process; and
   sending, by the instrumentation code, simulated data to the application;
   and reporting on the application corresponding to the application code to a sub-system outside the process.

2. The method of claim 1, further comprising capturing, by the instrumentation code, screen shots of the mobile device.

3. The method of claim 2, further comprising comparing, by the instrumentation code, the captured screen shots to previously-stored screen shots or sample screen shots.

4. The method of claim 1, further comprising receiving, by the instrumentation code, information from the application, the received information comprising variables stored within the process.

5. The method of claim 1, wherein the simulated data comprises:
   simulated user input;
   simulated navigational data;
   simulated location data; and
   simulated contact data.

6. The method of claim 1, wherein monitoring in run time an application corresponding to the application code using the instrumentation code, further comprises observing, by the instrumentation code, requests to and from the application.

7. The method of claim 1, wherein monitoring in run time an application corresponding to the application code using the instrumentation code, further comprises initiating, by the instrumentation code, an activity of the application.

8. A system comprising:
   one or more computers and one or more storage devices storing instructions that are operable, when executed by the one or more computers, to cause the one or more computers to perform operations comprising:
   instantiating a process for providing e-mail functionality, mapping functionality, or dialing functionality on a mobile device;
   injecting instrumentation code into the process from a device external to the mobile device;
   injecting application code into the process, wherein the application code and the instrumentation code are written in the same language;
   monitoring in run time an application corresponding to the application code using the instrumentation code, comprising:
   intercepting, by the instrumentation code, requests from the application to objects outside the process; and
   sending, by the instrumentation code, simulated data to the application; and
   reporting on the application corresponding to the application code to a sub-system outside the process.

9. The system of claim 8, further comprising capturing, by the instrumentation code, screen shots of the mobile device.

10. The system of claim 9, further comprising comparing, by the instrumentation code, the captured screen shots to previously-stored screen shots or sample screen shots.

11. The system of claim 8, further comprising receiving, by the instrumentation code, information from the application, the received information comprising variables stored within the process.

12. The system of claim 8, wherein the simulated data comprises:
   simulated user input;
   simulated navigational data;
   simulated location data; and
   simulated contact data.

13. The system of claim 8, wherein monitoring in run time an application corresponding to the application code using the instrumentation code, further comprises observing, by the instrumentation code, requests to and from the application.

14. The system of claim 8, wherein monitoring in run time an application corresponding to the application code using the instrumentation code, further comprises initiating, by the instrumentation code, an activity of the application.

15. A non-transitory computer-readable medium storing software comprising instructions executable by one or more computers which, upon such execution, cause the one or more computers to perform operations comprising:
- instantiating a process for providing e-mail functionality, mapping functionality, or dialing functionality on a mobile device;
- injecting instrumentation code into the process from a device external to the mobile device;
- injecting application code into the process, wherein the application code and the instrumentation code are written in the same language;
- monitoring in run time an application corresponding to the application code using the instrumentation code, comprising:
  - intercepting, by the instrumentation code, requests from the application to objects outside the process; and
  - sending, by the instrumentation code, simulated data to the application;

and reporting on the application corresponding to the application code to a sub-system outside the process.

16. The medium of claim 15, further comprising capturing, by the instrumentation code, screen shots of the mobile device.

17. The medium of claim 16, further comprising comparing, by the instrumentation code, the captured screen shots to previously-stored screen shots or sample screen shots.

18. The medium of claim 15, further comprising receiving, by the instrumentation code, information from the application, the received information comprising variables stored within the process.

19. The medium of claim 15, wherein the simulated data comprises:
- simulated user input;
- simulated navigational data;
- simulated location data; and
- simulated contact data.

20. The medium of claim 15, wherein monitoring in run time an application corresponding to the application code using the instrumentation code, further comprises observing, by the instrumentation code, requests to and from the application.

21. A computer-implemented method, comprising:
- instantiating a process on a mobile device;
- injecting instrumentation code into the process from a device external to the mobile device;
- injecting application code into the process, wherein the application code and the instrumentation code are written in the same language;
- monitoring in run time an application corresponding to the application code using the instrumentation code, comprising:
  - intercepting, by the instrumentation code, requests from the application to objects outside the process; and
  - sending, by the instrumentation code, simulated data to the application, the simulated data comprising:
    - simulated user input;
    - simulated navigational data;
    - simulated location data; and
    - simulated contact data; and
- reporting on the application corresponding to the application code to a sub-system outside the process.

22. A system comprising:
- one or more computers and one or more storage devices storing instructions that are operable, when executed by the one or more computers, to cause the one or more computers to perform operations comprising:
- instantiating a process on a mobile device;
- injecting instrumentation code into the process from a device external to the mobile device;
- injecting application code into the process, wherein the application code and the instrumentation code are written in the same language;
- monitoring in run time an application corresponding to the application code using the instrumentation code, comprising:
  - intercepting, by the instrumentation code, requests from the application to objects outside the process; and
  - sending, by the instrumentation code, simulated data to the application, the simulated data comprising:
    - simulated user input;
    - simulated navigational data;
    - simulated location data; and
    - simulated contact data; and
- reporting on the application corresponding to the application code to a sub-system outside the process.

23. A non-transitory computer-readable medium storing software comprising instructions executable by one or more computers which, upon such execution, cause the one or more computers to perform operations comprising:
- instantiating a process on a mobile device;
- injecting instrumentation code into the process from a device external to the mobile device;
- injecting application code into the process, wherein the application code and the instrumentation code are written in the same language;
- monitoring in run time an application corresponding to the application code using the instrumentation code, comprising:
  - intercepting, by the instrumentation code, requests from the application to objects outside the process; and
  - sending, by the instrumentation code, simulated data to the application, the simulated data comprising:
    - simulated user input;
    - simulated navigational data;
    - simulated location data; and
    - simulated contact data; and
- reporting on the application corresponding to the application code to a sub-system outside the process.

* * * * *